United States Patent Office 2,963,485
Patented Dec. 6, 1960

2,963,485

NEW PHENYLACETIC ESTERS AND PRODUCTION THEREOF

Henry Najer, Paris, and Pierre R. L. Giudicelli, Fontenay-sous-Bois, France, assignors to Les Laboratoires Dausse (Societe Anonyme), Paris, France No Drawing. Filed July 28, 1958, Ser. No. 751,184

Claims priority, application France July 29, 1957

1 Claim. (Cl. 260—294.3)

It is known that spasmolytic agents are found in the class of β-diethylamino-ethyl esters of phenyl acetic acids which bear an additional substituent on the carbon-atom to which the phenyl group is linked.

We have now found that 2-alkoxy-ethyl esters of α-phenyl-α-piperidino-acetic acid have spasmolytic, local anaesthetic and cough-relieving properties and that, having also a low toxicity, they are highly desirable for therapeutics, particularly in the form of water-soluble derivatives thereof.

According to this invention we provide a new class of compounds comprising 2-alkoxy-ethyl esters of α-phenyl-α-tertiary-aminoacetic acids and water-soluble acid addition salts thereof.

We also provide a process for the production of 2-alkoxy-ethyl esters of α-phenyl-α-tertiary-amino-acetic acids, wherein 2-alkoxy-ethyl esters of α-phenyl-α-halogeno-acetic acids are condensed wtih secondary amines in the presence of agents for binding the hydrogen halide produced, preferably in an anhydrous inert organic medium.

In particular a suitable excess of the secondary amine may be employed as a binding agent for hydrogen halide. The anhydrous inert organic medium may be provided by an aromatic hydrocarbon, particularly benzene.

The 2-alkoxy-ethyl esters of α-phenyl-α-halogeno-acetic acids, particularly α-phenyl-α-chloroacetic acid, to be employed as starting material are comprised by this invention. They may be produced in accordance with any one of the conventional esterifying methods, in particular by reacting α-phenyl-α-halogeno-acetic acid chlorides with 2-alkoxy-ethanols.

This invention is more particularly concerned with the compounds of the above types in which the tertiary-amino group is a piperidino group and the acid addition salts thereof, particularly the hydrochlorides thereof.

Generally the 2-alkoxy-ethyl α-phenyl-α-piperidino-acetates are colourless liquids which can be distilled in vacuum, are soluble in ethyl alcohol, ether and other usual organic solvents but are insoluble in water. The hydrochlorides thereof may be obtained for example by dissolving the bases in anhydrous ether and passing dry hydrogen chloride through the ether solutions; the hydrochlorides generally are white, water-soluble crystalline substances, some of which are very hygroscopic. On the contrary the hydrobromides are not hygroscopic and they are very soluble in water and also in ethyl alcohol. On that account they are generally preferred in being more convenient in handling.

Particularly important compounds in the above class are the hydrochloride and the hydrobromide of 2-n-butoxy-ethyl α-phenyl-α-piperidino-acetate. They were found to be as potent as papaverine as a musculo-tropic spasmolytic and 5 times more local anaesthetic than procaine on rabbit cornea. In addition they shewed cough-relieving properties 2 to 3 times more intensive than codeine. Finally the FD-50 for the hydrochloride and the hydrobromide were found to be 155 mg./kg. and 220 mg./kg. respectively after intravenous administration to white mice (Kaerber and Behrens method), i.e. less than those of procaine and codeine.

Our invention comprises cough-relieving compositions containing the hydrochloride or hydrobromide of 2-n-butoxy-ethyl α-phenyl-α-piperidino-acetate or the corresponding base.

The 2-alkoxy-ethyl α-phenyl-α-chloro-acetates generally are colourless liquids which cannot be distilled even in a high vacuum, soluble in ethyl alcohol, ether and other organic solvents but insoluble in water.

The following example will illustrate this invention.

*Example*

(a) *2-n-butoxy-ethyl α-phenyl-α-chloro-acetate.*—Into a 250 ml. three-neck flask provided with a mechanical stirrer, a dropping funnel and a reflux cooler, a solution of α-phenyl-α-chloro-acetic acid chloride (38 g.; 0.2 mol) in 2-n-butoxy-ethanol (30 ml.) was introduced drop by drop in 20 minutes with continuous stirring. The mixture warmed up with evolution of hydrogen chloride. The reaction was completed by heating on a boiling water-bath for 2 hours.

The mixture was allowed to cool and 250 ml. of water was added thereto; the mixture was stirred vigorously and the separated oil extracted three times successively with ether (150 ml. each time). The combined ether extracts were dried over sodium sulphate and ether driven off (the last traces thereof on a water-bath in vacuum).

There was thus obtained 2-n-butoxy-ethyl α-phenyl-α-chloro-acetate (54 g.; yield 100%) which was employed in crude form in the next step to be described now.

(b) *2-n-butoxy-ethyl α - phenyl - α - piperidino - acetate.*—A mixture of 2-n-butoxy-ethyl α-phenyl-α-chloro-acetate (27 g.; 0.1 mol.) and piperidine (17 g.; 0.2 mol.) in anhydrous benzene (150 ml.) was refluxed for 8 hours.

The reaction mixture was allowed to cool, piperidine hydrochloride filtered off and washed 3 times with benzene. The filtrate to which the benzene washing liquors were combined was distilled on a water bath to remove benzene, the oily residue triturated with water (100 ml.) then extracted three times successively with ether (100 ml. each time). The combined ether extracts were washed twice with water (70 ml. each time), dried over sodium sulphate, ether removed therefrom and the residue rectified in vacuum.

There was finally obtained 2-n-butoxy-ethyl α-phenyl-α-piperidino-acetate (22.1 g.; yield 69.2%) as a colourless oil distilling at 143–144°/0.2 mm., soluble in ethyl alcohol and ether and insoluble in water.

(c) *Hydrochloride of base (b).*—The base was dissolved in anhydrous ether and dry hydrogen chloride passed through the ether solution. Dried in vacuum over phosphorus pentoxide, the hydrochloride which is separated and was isolated was an amorphous, extremely hygroscopic, water-soluble substance.

(d) *Hydrobromide of base (b).*—Similarly prepared by substituting hydrogen bromide for hydrogen chloride, the hydrobromide had a melting point of 99° C. (after recrystallisation from methyl-isobutyl-ketone); it was not hygroscopic and was very soluble in water and in ethyl alcohol.

By a similar procedure we obtained:

(e) 2-methoxy-ethyl α-phenyl-α-piperidino - acetate with a yield of 74%; B.P. 131–132° C./0.4–0.5 mm. Hg; the hydrochloride thereof was hygroscopic; the hydrobromide thereof had a M.P. of 108° C. and was very soluble in water and in ethyl alcohol.

(f) 2-ethoxy - ethyl α-phenyl-α-piperidino - acetate with a yield of 67.8%; B.P. 140–141° C./0.5 mm. Hg;

the hydrochloride thereof, recrystallised from ethyl acetate, had a melting point of 105° C.; the hydrobromide thereof had a melting point of 137–138° C. and was very soluble in water and in ethyl alcohol.

(g) 2-n-hexyloxy-ethyl α-phenyl-α-piperidino - acetate with a yield of 70.6%; B.P. 161–162° C./0.7–0.8 mm. Hg; the hydrochloride thereof was hygroscopic; the hydrobromide thereof had a melting point of 90–91° C. and was very soluble in water and in ethyl alcohol.

What we claim is:

A member of the class consisting of the ester of the formula

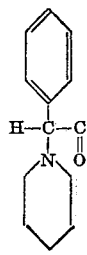

the hydrochloride, and the hydrobromide of said ester.

No references cited.